United States Patent Office 3,453,810
Patented July 8, 1969

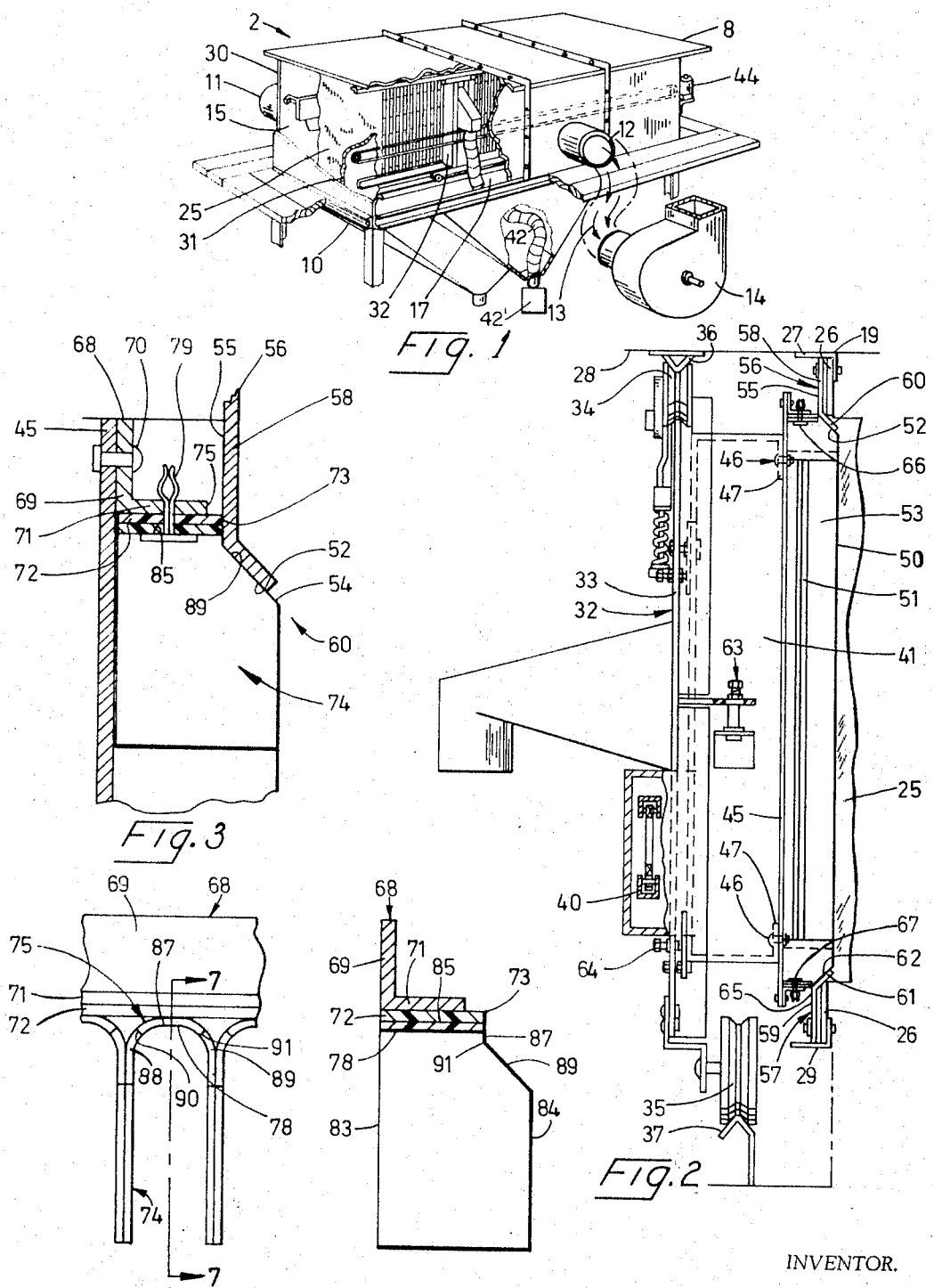

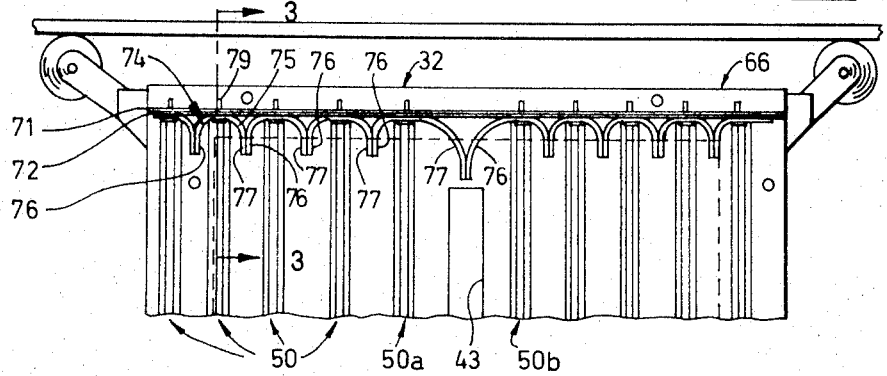
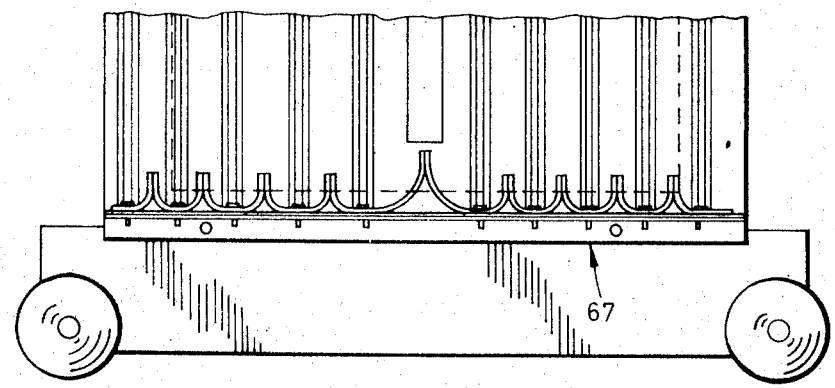
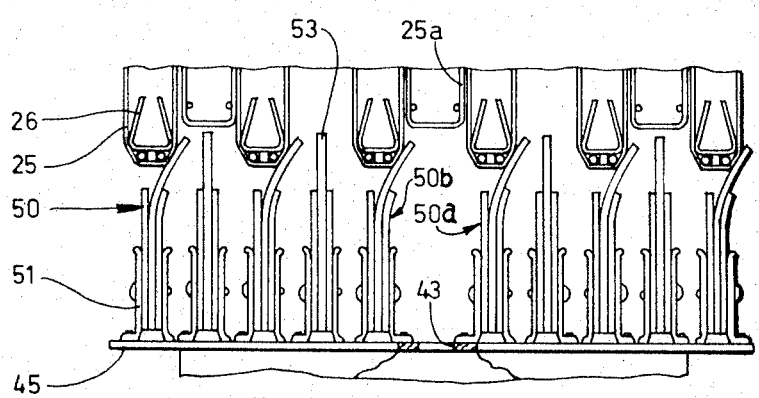
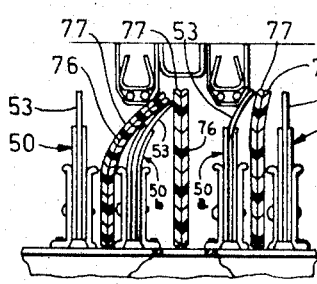

3,453,810
DUST COLLECTING APPARATUS
Allen H. Jones, Chagrin Falls, and Edward F. Reed, North Olmsted, Ohio, assignors to The W. W. Sly Manufacturing Co., Cleveland, Ohio, a corporation of Ohio
Filed Jan. 16, 1968, Ser. No. 698,276
Int. Cl. B01d 29/16
U.S. Cl. 55—294    10 Claims

ABSTRACT OF THE DISCLOSURE

A pneumatic sealing device for use in a dust collector of the type having a frame, a plurality of dust collecting bags supported on the frame, sealing rails disposed adjacent the top and bottom of the bags, and a traveler adapted for both relative movement with respect to the bags and the frame and for delivering pressurized air into the bags. The sealing device comprises a pair of support members mounted adjacent the top and bottom of the traveler and a plurality of flexible strips which are carried by each of the support members for sliding sealing engagement with the respective sealing rails.

Background of the invention

This invention relates to dust collectors of the reverse-blow type having a traveler mechanism associated therewith for delivering pressurized air into dust collecting bags for the removal of dust therefrom, and particularly to an improved pneumatic sealing means to prevent air leakage between the traveler and the dust collector frame.

The present invention constitutes an improvement of the construction shown in the application of Carl R. Sare, Ser. No. 565,145.

In application Ser. No. 565,145, a plurality of wiper blades were mounted vertically and in parallel relationship on a traveler mechanism which was adapted to move back and forth across the open ends of dust collecting bags. The traveler mechanism which carried the blades was adapted to receive air under pressure and to discharge it through a slot in the wall thereof into the open end of one of the bags. By this arrangement, pressurized air is introduced into the interior of the bags progressively in a direction opposite to the flow of dust-laden air, thereby dislodging the particles of dust entrapped on the opposite surfaces of the bags.

Although this system provides a very effective means for cleaning the dust from filter bags, problems were encountered in effecting a seal and preventing the leakage of pressurized air past the top and bottom of the blades on the traveler mechanism.

Previous attempts to prevent such air leakage included the use of metallic strips which extended across the top and bottom ends, respectively, of the blades. The strips and the blades bore against a stationary rail as the traveler moved back and forth. This system has not been entirely satisfactory in that the presence of dust in the apparatus, coupled with the mechanical pressure which had to be exerted by the metallic sealing member against the rails at the top and bottom, respectively, of the traveler, caused premature wear and failure of the air seal. Additionally, the unevenness of the rails also provided an additional preventative in obtaining a satisfactory seal.

Summary of the invention

The sealing device of the present invention is adapted for use with a dust collector of the type including a frame, a plurality of dust collecting bags, pneumatic sealing rails mounted on the frame and disposed adjacent the frame and disposed adjacent the top and bottom ends of the bags, and a traveler mounted on the frame and adapted for relative movement with respect to the frame. The traveler is used for directing a supply of pressurized clean air into the open ends of the bags for the removal of dust entrapped on the exterior surfaces of the bags. The sealing rails preferably include an upright portion and an inclined portion which aids in directing the clean air into the bags. The traveler is provided with a plurality of spaced-apart blade members adapted for coacting engagement with the open ends of the bags upon movement of the traveler relative to the frame. A sealing means is carried by the traveler and comprises a pair of oppositely disposed support members mounted on and disposed adjacent the top and bottom of the traveler. Each of the support members is provided with a flat strip of rubber-like material which extends lengthwise of the support member and has one edge thereof in engagement with one of the sealing reals. In addition, the members support a plurality of U-shaped strips which are disposed in side-by-side relation lengthwise along the support member. The U-shaped strips include a bight portion disposed adjacent to the support member and a pair of flap members extending from the opposite ends of the bight portion. The bight portion is positioned so as to be slightly spaced-apart and in overlying relation with respect to the distal ends of the blades while the flap members project away from the support members inwardly of the traveler into the spaces between the blades. The U-shaped strips are positioned such that the bight portion slidably engages the upright portion while the flap members slidably engage the inclined portion of the rails.

By the foregoing arrangement, there is provided an extremely effective sealing means, which eliminates metal-to-metal sliding contact and which reduces the leakage of pressurized air along the top and bottom ends of the wiper blades to a minimum. An additional advantage is that positioning of the U-shaped strips in the aforementioned manner provides for a more effective distribution of pressurized air into the dust collecting bags. Furthermore, the aforementioned arrangement results in the pressure on the inside of the face of the strips always being greater than that on the outside of the strips thereby causing the strips to deform under the force of the pressurized air and improving the seal. In addition, the device provides a compact structure which can be readily and easily removed and installed as a unit with a minimum of disturbance to the other parts of the dust collecting apparatus.

Brief description of the drawings

FIG. 1 is a perspective view, partly broken away, of a dust collecting apparatus which may be equipped with the present invention;

FIG. 2 is a fragmentary side elevational view of the traveler mechanism of the dust collecting apparatus of FIG. 1 in the operative position adjacent the dust wall;

FIG. 3 is an enlarged fragmentary side plan view, partly in section, taken along the line 3—3 in FIG. 4, showing the novel sealing device of the present invention in sealing engagement with a portion of the dust wall;

FIG. 4 is a cut-away view of the front of the traveler mechanism of FIG. 2 having the sealing devices of the present invention mounted adjacent the top and bottom thereof;

FIG. 5 is a fragmentary top view, partly in section, of the blade members of the dust collecting apparatus of FIG. 1 in sealing engagement with a portion of the dust wall;

FIG. 6 is an enlarged view of one of the U-shaped strips of FIG. 4;

FIG. 7 is a cross-sectional view taken along the line 7—7 of FIG. 6; and

FIG. 8 is a partial view of FIG. 5 showing the flap members in cross section disposed between the wiper blades.

*Description of the preferred embodiments*

A dust collector of the type with which the sealing device of the present invention may be adapted for use is illustrated, generally at 2, in FIG. 1 and may include a housing 8 mounted on a frame 10. Dust laden air may be admitted through a pipe 11 and clean air discharged through a pipe 12. The flow of air through the apparatus, schematically illustrated as by arrows 13 (FIG. 1), is induced by a blower 14 which may be connected to the pipe 12 in any suitable manner.

The casing is divided into two chambers, one of which is a dust chamber 15 and the other of which is a clean air chamber 17, which may be separated by dust wall designated generally at 19 (FIG. 2). The dust wall 19 includes a plurality of fabric-type dust collecting bags 25 which are open at their ends adjacent the clean air chamber 17. The bags 25 may be attached at their front ends to and threaded between a plurality of mullions 26 which may be vertically mounted in laterally spaced relationship, as shown in FIGS. 2 and 5, between a top horizontal angle bar 27, which may be fastened to a top wall 28 of the housing 8, and a bottom horizontal angle bar 29, which may be mounted in the base of the housing 8. The bags 25 extend into the dust-laden air chamber 15 and may be attached to the rear wall 30 (FIG. 1) of the housing 8 in a manner well-known in the art so as to provide a seal with the mullions 26. By this arrangement, the bags 25, together with the partitions 31 (only one shown in FIG. 1), provide a dust impervious barrier which operates to separate the dust-laden air chamber 15 from the clean air chamber 17.

Reverse air flow for cleaning the bags is achieved by means of a traveler mechanism 32 which includes a frame 33 having wheels 34 and 35 disposed for rolling movement along oppositely disposed horizontal bars or tracks 36 and 37 (FIG. 2). The traveler 32 may be propelled along its tracks 36 and 37 by a chain and sprocket mechanism 40 which in turn may be driven by an electric motor 44, mounted on the housing 8, whereby the traveler moves past the row of bags and is at any given moment opposite selective ones, such as a few, of the bags 25. The traveler 32 includes an air compartment 41 which is mounted on the frace 33 and has an inlet duct 42 mounted on the exterior frame 33 and adapted for connection to a source of clean pressurized air 42'.

The air compartment 41 includes a plate 45 which is mounted, as by bolts 46, to a flange 47 which extends around the periphery of the air compartment. A plurality of vertically extending wiper blade elements 50 are mounted, as by brackets 51, on the surface of the plate 45 adjacent the bags. Each blade element 50 includes an elongated finger member 53 which is of sufficient length (FIG. 5) to project into the bags 25. Depending upon the direction of movement of the traveler 32, the finger members 53 are adapted to engage those portions of the bags which are disposed adjacent the mullions 26 and to provide a seal for directing the pressurized air through a slit 43 which is disposed in the plate 45 (FIG. 4) between the wiper blades 50a and 50b, and into the bag 25a which is aligned with the air discharge slit 43. This arrangement provides a very effective seal against short-circuiting of the clean air and concentrates the flow of air into one bag at a time.

The fingers 53 are slightly longer than the corresponding length of the openings in the bags and are beveled, as at 54 (FIG. 3), so as to enter readily into the openings in the bags.

Sealing rails 56 and 57 may extend generally horizontally and transversely of the open ends of the bags adjacent the top and bottom thereof, and may each have a generally vertically extending upright portion 58 and 59, respectively, and an inclined portion 60 and 61, respectively (FIG. 2). The inclined portions 60 and 61 are inclined toward one another and toward the bags 25, whereby the front surfaces 52 and 62 of the inclined portions 60 and 61, respectively, provide a baffle to direct the air into the bags 25. The sealing rails 56 and 57 may be securely fastened adjacent the upright portions 58 and 59 to the top angle bar 27 and to the bottom angle bar 29, respectively, in any suitable manner, such as by bolts or the like. Preferably, the angle of inclination of the inclined portions 60 and 61 with respect to the general plane of the upright portions 58 and 59 is substantially equal to the angle of the bevel 54, thereby effecting a seal between the beveled edge 54 and the inclined portion 60.

Adjustment assemblies 63 and 64 may be provided for horizontal and vertical movement respectively of the air compartment with respect to the frame 33 of the traveler for a reason which will become apparent hereinafter.

A more detailed description of the heretofore mentioned features is provided in the co-pending United States application Ser. No. 565,145 of Carl R. Sare, filed July 14, 1966.

The present invention provides an improved and more effective means, illustrated generally at 66 and 67 in FIG. 2, for preventing the escape of pressurized reverse air between the top and bottom of the traveler mechanism 32 and the associated parts of the dust collector frame 10. One of the devices 66 is disposed lengthwise along the top of the traveler 32 while the other device 67 is disposed along the bottom of the traveler 32 in inverted relation to the device 66 (FIG. 4). As the sealing devices 66 and 67 are identical in configuration, only one, such as at 66 (FIGS. 3 and 4), will be described in detail.

The sealing device 66 comprises a support member in the form of an angle bar 68 which may extend lengthwise horizontally along the upper edge of the plate 45 and may be fastened thereto by means of rivets 70 or the like. When viewed in end elevation (FIG. 3) the angle bar 68 may include a generally vertically extending flange 69 which is disposed adjacent plate 45, and a generally horizontally extending flange 71, which extends generally perpendicular to the plate 45.

The sealing device 66 may be provided with a flat flexible rubber-like strip 72 which is attached to the flange 71 and which extends over a substantial portion of the full length of the angle bar 68. Preferably, the outer marginal edge 73 of the strip 72 projects beyond the marginal end 75 of the flange 71 and should be of sufficient length so as to engage the outer surface 55 of the upright portion 58 of the sealing rail 56.

To provide sealing between the distal ends of the individual blades 50 and/or lengthwise of the support member 68 and/or provide a more efficient flow of air into the respective ones of the bags, a plurality of flexible rubber-like sealing strips 74 may be provided and disposed in side-by-side relationship along the flange 71 adjacent the strip 72 (FIG. 4). The sealing strips 74 may be generally U-shaped in configuration when viewed in front elevation as shown in FIG. 4, and may include a bight portion 75 and a pair of arms or flap members 76 and 77. Preferably, each of the sealing strips 74 is connected by means of a suitable fastening device, such as the clip 79, with the bight portion 75 disposed in engagement with the strip 72 and the flaps projecting outwardly away from the opposite ends of the bight portion 75 in a direction away from the flange.

Preferably, the strips 74 extend substantially the full length of the support members 68 with the flap of one strip 77 engaging a flap member 76 of the adpacent strip. As the ends of the flaps are preferably not secured in any manner, they are free to flex with respect to one another.

As shown in FIGS. 4 and 5, the blades 50 may be disposed in generally parallel spaced relation on the plate 45 with the space between the respective blades 50 being substantially equal except for the blades 50a and 50b, which are disposed on opposite sides of the slit 43. Preferably, each strip 74 is positioned such that the center of the bight portion is aligned with the center of the blade 50, thereby providing a hood-like arrangement for each of the respective blades 50. In addition, the flaps 76 and 77 may be approximately the same width as the finger elements 53 whereby the flaps and the finger elements will both engage the bags 25 as the traveler moves across the bags (FIG. 8). Both of the foregoing arrangements contribute to substantially seal off the opposite ends of the blades 50.

Referring now to FIG. 6, the strip 74 is preferably made from resilient flexible material, which tends to flatten out when removed from the installed position between adjacent strips. When the strip 74 is viewed in cross section and in side elevation, as shown in FIG. 7, the strip is generally polygonal in configuration having an outer edge 83 and an inner edge 84 which define planes which may be generally parallel to one another. The strip 74 also includes a generally flat upper surface 85 and linear edges 81 and 82 along the opposed distal ends thereof, and which extend generally parallel to the upper surface 85. Preferably, the strip 74 is provided with a curved sealing edge 87 which defines a plane which is intermediate of and generally parallel to the planes defined by the outer edge 83 and the inner edge 84. The curved sealing edge 87 defines the inner edge of the bight portion 75 and terminates at its opposite ends in inclined sealing edges 88 and 89 of the flaps 76 and 77, respectively. Preferably, the juncture of the sealing edge 87 and the inclined sealing edge 89, such as at 90 and 91 (FIG. 6), are positioned below the uppermost portion of the inner surface 78 of the bight portion 75, resulting in the sealing edge 87 being curved when viewed in front elevation in FIG. 7. The inclined sealing edge 89 extends from the juncture 91 generally downwardly and in a direction away from the outer edge 83 terminating in the inner edge 84. Preferably, the angle of inclination between the inclined sealing edges 88 and 89 and the curved sealing edge 87 is approximately equal to the aforementioned angle of inclination of the upright portion 58 and inclined portion 60 of the sealing rail 56, respectively.

Referring now to FIG. 3, the strips 74 may be connected to the angle bar 68 at the bight portion by means of the clip 79, with the upper surface 85 engaging the strip 72. Preferably, the outer edge 73 of the strip 72 and the upper sealing edge 87 slidably engage the front surface 55 of the upright portion 60 of the sealing rail 56 while the inclined sealing surface 89 slidably engages the front surface 52 of the inclined portion 60 of the sealing rail 56. To achieve the above relationship, the juncture of the front surfaces 52 and 55 of the sealing rail is preferably positioned so as to coincide with the juncture of the front sealing edge 87 and the inclined sealing edge 89 of the strip 74.

To prevent excessive wear of the sealing rails 56 and 57, it is preferred that the sealing strips 72 and 74 be made of a elastomeric material, such as rubber, plastic or the like, but preferred materials for the strips 72 and 74 are the elastomeric materials, such as A Neoprene, a trade designation of the B. F. Goodrich Company, and code A357C Neoprene Nylon, a trade designation of the Goodyear Tire and Rubber Company.

As can be seen from the foregoing, the novel sealing device of the present invention provides a new and improved means for sealing the respective top and bottom ends of the blades on a traveler mechanism in a dust collector. The foregoing arrangement eliminates metal-to-metal contact and provides a more efficient baffling for directing the pressurized air into the respective filter bags of the dust collector. Furthermore, the device of the present invention is a compact assembly which may be readily removed and installed as a single unit with only a minimum of disturbance to other parts of the dust collector.

We claim:

1. In a dust collector including a frame, a housing mounted on said frame including a dust chamber provided with an inlet and a clean air chamber with an outlet means for discharging clean air, a plurality of dust collecting bags which are dust impervious and air pervious extending longitudinally across the housing separating said dust chamber from said clean air chamber, each bag extending substantially from the top to the bottom of the housing, said bags disposed in side-by-side relation and being open at one end and closed at the other end, a plurality of generally parallel spacer members supported in said housing supporting the sides of the bags adjacent the open ends thereof, said spacer members extending transversely of said housing and being supported adjacent their opposed distal ends by said housing, sealing rails mounted on said frame and extending across the top and bottom ends of said bags adpacent the opposed distal ends of said spacer members, each of said sealing rails including angular baffle-like engagement portions projecting into the opposed distal ends of the bags, a traveler including an open end defining an air compartment adjacent an open end of said bag and closed at the opposed end, said traveler being mounted on said frame for longitudinal movement across the open ends of the bags, means for moving said traveler across the bags, said traveler being connected to a source of air pressure at said closed end to direct said pressurized air into the open ends of the bags, said air compartment being provided with a transverse plate including a central opening and a plurality of laterally spaced flexible parallel blade members extending across said plate on each side of opening, said blade members flexibly engaging said spacer members along the sides thereof and thereby projecting into the open ends of the bags as the traveler traverses its longitudinal path for sequentially sealing off a respective one of said bags and connecting same to the source of pressurized air, sealing means mounted on said transverse plate across the opposed distal ends thereof, said sealing means comprising a plurality of generally U-shaped elastomeric strips aligned with the opposed distal ends of said flexible blades to define a seal for the open end of a respective bag said strips resiliently engaging said sealing rails along said baffle-like engagement portions and cooperating with said blade members to provide a pneumatic seal between said transverse plate of the traveler and the open end of a respective bag.

2. In a dust collector in accordance with claim 1, wherein:
    said blade members are generally vertically oriented on said traveler, and wherein:
        said sealing rails extend generally at right angles to said blade member for resilient sealing coaction of the opposed distal ends of said blade member on the baffle-like engagement portions of said sealing rails upon movement of said traveler across said bags.

3. In a dust collector in accordance with claim 2, wherein:
    each of said support members mounts a row of said strips disposed in engaged side-by-side relationship,
    each of said strips having a generally U-shaped configuration opening in a direction toward said blade members,
    each of said strips defined by a bight portion disposed adjacent the respective support member and a pair of laterally spaced flap portions extending inwardly from said bight portion,
    said bight portions disposed in overlying engagement with the opposed distal ends of said blade members, and
    the adjacent flap portions of said strips being flexibly engaging one another in a lengthwise direction along the respective support members.

4. In a dust collector in accordance with claim 1, wherein:
said baffle-like engagement portions each include an upright portion attached to said frame and an inclined portion,
said inclined portions extending outwardly toward one another in a direction away from said support members so as to direct pressurized air in the direction of the open ends of the respective of said bags.

5. In a dust collector in accordance with claim 4, wherein:
each of said support members mounts a row of said strips disposed in engaged side-by-side relation lengthwise of said support members,
each of said strips having a generally U-shaped configuration opening in the direction of said blade members defined by a bight portion and a pair of laterally spaced flap portions,
said bight portion having a curved sealing edge slidably engageable with the respective of said upright portions, and
said flap portions having an inclined sealing edge slidably engageable with the inclined portions of the respective sealing rails upon transverse movement of said traveler across said bags.

6. In a dust collector in accordance with claim 5, wherein:
said flap portions have a widthwise dimension substantially equal to the widthwise dimension of said blade members.

7. In a dust collector in accordance with claim 5, wherein:
said blade members are generally vertically oriented on said traveler, and
each of said blade members disposed substantially in alignment with the center of the bight portions of the respective opposed strips to provide a hood-like construction around the opposed distal ends of said blade members.

8. In a dust collector in accordance with claim 5, wherein:
the bight portions of the respective strips are detachably connected to the respective support members by a fastener element, and
the angle of inclination of the inclined portions of said rails and the inclined edges of said flap portions being approximately equal to one another.

9. In a dust collector in accordance with claim 5, including:
a flexible support strip attached to and extending lengthwise of each of said support members,
the bight portion of said strips bearing against said support strips, and
said support strips having a greater widthwise dimension than said support members so as to project outwardly therefrom into engagement with the upright portion generally adjacent their juncture with the inclined portions of said rails.

10. In a dust collector in accordance with claim 5, wherein:
said flap portions having a greater widthwise dimension than said bight portions,
the widthwise dimension of said flap portions being approximately equal to the widthwise dimension of said blade members, and
the curved sealing edges of said strips extending from said bight portions downwardly and outwardly towards the respective flap portions for slidable engagement with the inclined portions of said rails.

References Cited

UNITED STATES PATENTS

| | | | |
|---|---|---|---|
| 2,507,335 | 5/1950 | Donohue | 55—341 |
| 2,583,039 | 1/1952 | Boesger | 55—341 |
| 2,906,371 | 9/1959 | Jones | 55—294 |
| 2,938,598 | 5/1960 | Jones et al. | 55—341 |
| 3,251,175 | 5/1966 | Black | 55—294 |
| 3,256,995 | 6/1966 | Schmid et al. | 210—411 |

FOREIGN PATENTS

| | | |
|---|---|---|
| 1,009,993 | 11/1965 | Great Britain. |
| 1,010,337 | 11/1965 | Great Britain. |

HARRY B. THORNTON, *Primary Examiner.*

B. NOZICK, *Assistant Examiner.*

U.S. Cl. X.R.

55—302, 341